Oct. 26, 1948.   R. H. PIKE   2,452,145
TELESCOPE SIGHT MOUNTING
Filed June 25, 1946

INVENTOR.
RALPH H. PIKE
BY
ATTORNEY

Patented Oct. 26, 1948

2,452,145

UNITED STATES PATENT OFFICE 2,452,145

TELESCOPE SIGHT MOUNTING

Ralph H. Pike, Kalispell, Mont.

Application June 25, 1946, Serial No. 679,155

2 Claims. (Cl. 33—50)

This invention relates to an improved mount for a telescope upon a firearm.

While a telescopic sight is frequently used upon a firearm, there are many times when it is not needed, or when the attachment of the telescopic sight to the firearm is undesirable. For example, under some weather conditions the use of a telescopic sight may be out of the question. During transportation of the firearm, it is frequently desirable to carry the telescope sight in a mechanical structure which will afford greater protection to it than is usually afforded to a firearm.

Removal of the sight should preferably be easily accomplished by hand and without the use of any tools or any involved manipulation. The necessity for observation of these factors will become apparent when it is recalled that removal of a telescopic sight may have to be performed with cold hands or with hands encased in gloves and under difficult conditions of weather or terrain and frequently with considerable speed. The structure of the present invention meets all of these needs. At the same time, the mount is such that it assures automatic seating of the telescope in exactly the same seating position upon each installation. The mount is such that the telescope can be installed and removed by hand, with a minimum of effort and without the necessity for using tools or other devices. In addition, the mount is such that the telescope is protected from any adverse effect of recoil and is not unseated by any recoil action.

It is in general the broad object of the present invention to provide a novel and improved telescope sight mounting and particularly one which permits of convenient, simple and ready removal or installation solely by hand.

An additional object of the present invention is to provide an improved and novel telescopic sight which ensures that the sight will be mounted upon the firearm in the same position of adjustment each time that the telescope is installed.

A further object of the present invention is to provide a telescope sight which is relatively rugged so that the telescope is protected against any recoil effect.

The invention includes other objects and features of advantage, some of which, together with the foregoing, will appear hereinafter wherein the present preferred form of telescope sight mounting of this invention is disclosed.

Referring to the drawings accompanying and forming a part hereof,

Figure 3:
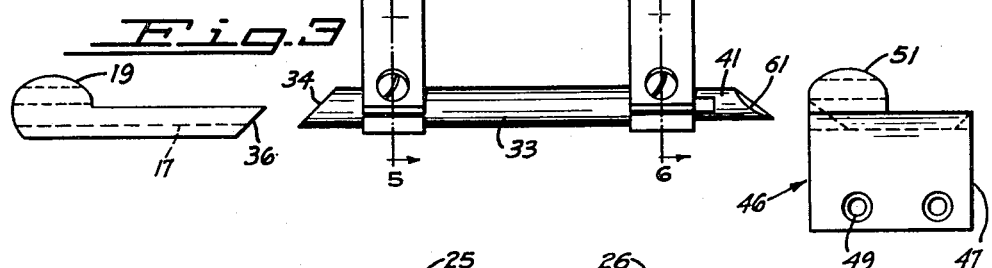
Figure 3 is a side view of the several parts of the telescope mount spaced apart for added clarity.
Figure 4:
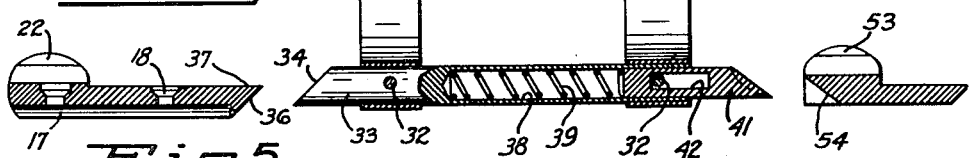
Figure 4 is a section taken along the line 4—4 in Figure 2.
Figures 5, 6:
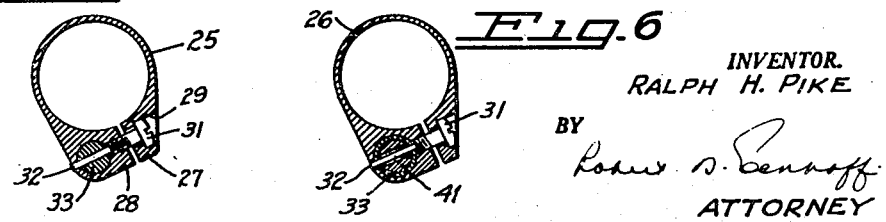

Figures 5 and 6 are respectively sections taken through one of the telescope barrel yokes along line 5—5 and 6—6 in Figure 3.

Figure 1:
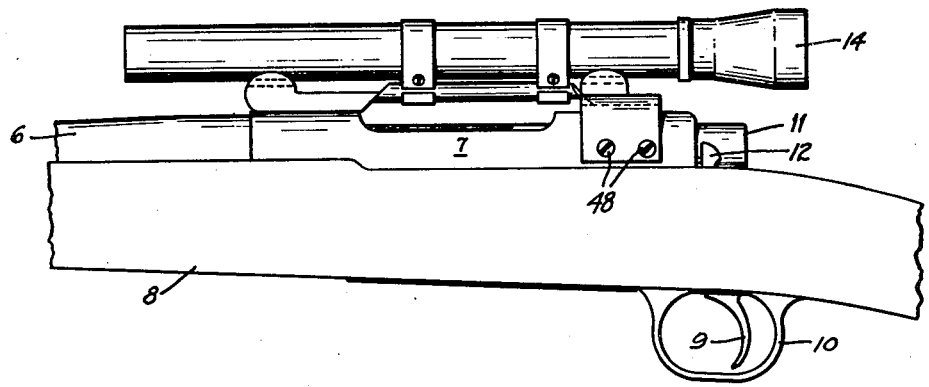
Figure 1 is a side elevation showing the provision of the telescope mount upon a rifle with a telescope in place.
Figure 2:
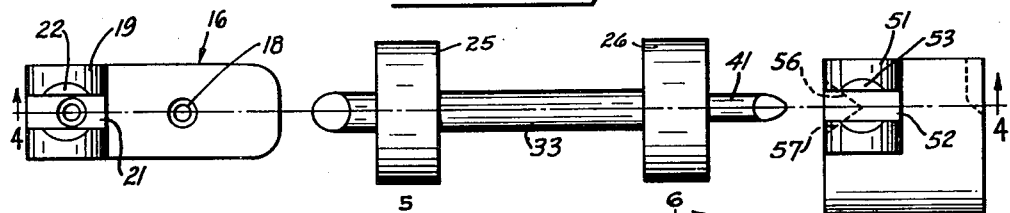
Figure 2 is a plan view of the telescope mount with the several parts thereof spaced apart for added clarity.

To illustrate the installation and construction of the telescope mount, I have shown a conventional rifle in Figure 1 including barrel 6, receiver 7, fore-stock 8, the usual trigger 9 and trigger guard 10, bolt 11 and bolt release lever 12. A typical telescope sight 14 is illustrated in Figure 1 as of the conventional elongated cylindrical form positioned and supported above receiver 7 in longitudinal and substantial parallel alignment with barrel 6 so that the sight axis of the telescope may be utilized for the sighting and aiming of the rifle.

The improved sight mounting of the present invention is designed to support the telescope 14 at spaced points on its length and to provide for the correct altitudinal and lateral positioning of the telescope sight axis with respect to the longitudinal axis of the barrel 6 each time the sight is positioned on the rifle. To mount and support the forward portion of the telescope 14, I provide a first saddle member 16. On its under side, the saddle member is usually arcuately formed as at 17 to fit the forward part of the receiver; and necessary form can be utilized. One or more screw holes 18 are provided in the saddle to permit the saddle to be attached and fixed to the receiver or to the barrel. At its forward end, the first saddle includes two upstanding shoulders 19 separated by a slotted portion 21. Each shoulder 19 is formed with a flat face 22 thereon to engage and support the under side of the barrel or tube of telescope 14.

To provide for attachment of the telescope, a pair of spaced yokes 25 and 26 are provided. These are preferably of the split type so that each yoke includes ends 27 and 28. A recess 29 is provided in end 27 and a threaded screw 31 is inserted in the recess and engaged with end 28 so that the size of the yoke can be diminished and the yoke brought into clamping engagement with the barrel of the telescope. Each threaded screw 31 is provided with an extending but unthreaded end 32 which projects through and retains each yoke in a fixed position upon base member 33 (Figures 5 and 6).

At its forward end, the base member 33 is provided with a flat angular face 34, adapted to fit complementarily beneath a corresponding flat face 36 provided upon the receiver end 37 of saddle 16. The base member 33 is recessed as at 38 to receive a coiled spring 39 and a slidable plunger 41. Plunger 41 includes a slot 42 through which a pin 32 projects, the pin retaining the plunger in position and limiting its travel under the bias of spring 39 to the length of slot 42.

To provide for support of a telescope at the rear end of the receiver, I mount a second saddle member generally indicated by numeral 46. The second saddle is fashioned for suitable mounting on the firearm. Generally an arcuate portion 47 is provided to fit the receiver 7 to which it is attached by screws 48 inserted in suitable screw holes 49. The second saddle member also includes a pair of upstanding shoulders 51 spaced apart by a slot 52 and each having a flat face 53 thereon corresponding to faces 22 upon shoulders 19 on saddle member 16 and upon which the rearward end of the telescope rests. The width and depth of slots 21 and 52 is such that when the telescope is not in place, the firearm can be sighted with the usual front and rear sights, the so-called "iron sights."

To provide a detachable connection between the telescope and the saddle, the forward end of the second saddle member 46 is formed with a V-shaped recess 54 provided by two flat V-faces 56 and 57. The end of plunger 41 is preferably formed with an arcuate face 61; using an arcuate face in conjunction with the V-shaped recess 54 provides for accurate alignment of the telescope in position upon each seating. It is preferred to a V to V seating between the recess and plunger.

With yokes 25 and 26 in place about the telescope tube and with the first and second saddle members 16 and 46 installed in place, the telescope is readily installed by placing the butt of the firearm against one's leg and grasping the fore-stock with the left hand so that the fingers of that hand extend forwardly about the fore-stock. If the telescope is then brought into position in the right hand and the projecting end of plunger 41 is brought into position so that arcuate face 61 thereon is in engagement with the V-shaped slot 54, upon pulling toward the butt with the right hand while the fingers on the left hand engage the forward end of the telescope tube and guide it into alignment with the barrel axis, spring 39 will be compressed and plunger 41 moved inwardly until the projecting end 34 is brought into seating engagement with face 36. If the telescope is then released, the spring 39 is effective to pull the telescope tube into seating engagement with each of the flat faces 22 and 53 upon the first and second saddles respectively.

To remove the telescope, the operation is reversed, that is, the rifle is placed with its butt against one's leg, while the left hand is placed about the fore-stock of the rifle with at least two of the fingers of the left hand in engagement with the forward end of the telescope tube. If the right hand is then brought into engagement with the telescope tube and a rearward pull is exerted upon the telescope tube, the fingers of the left hand will be able to move the tube to the right or left, as desired, upon spring 39 being compressed, until the telescope can be removed.

In a mount on a gun having a heavy recoil, base member 33 can be provided with a separate plunger, like plunger 41, at its forward end so that a spring biased plunger is provided for engagement with each of saddle members 16 and 46. Also, the face engaging each saddle member can be flat, as is face 34, or arcuate, as is face 61.

I claim:

1. Means for detachably mounting a telescope, having a tube upon the upper side of a firearm having a barrel, comprising spaced front and rear saddles mounted on said firearm, each of said saddles having a pair of spaced shoulders thereon formed to engage the telescope tube and support said telescope in a fixed position of alignment with respect to said barrel, a base member on said telescope having at its rear end a spring-pressed plunger, cooperating flat faces on said front saddle and the front of said base, a V-shaped angular face on said rear saddle and a cooperating arcuate angular face on said plunger, said four cooperating faces being so oriented that when the telescope is mounted on the firearm with the base located between the saddles the pressure of the spring-pressed plunger tends to urge the tube into contact with the spaced shoulders of the saddles.

2. Means for detachably mounting a telescope having a tube upon the upper side of a firearm having a barrel, comprising spaced front and rear saddles mounted on said firearm, each of said saddles having a pair of spaced shoulders thereon formed to engage the telescope tube and support said telescope in a fixed position of alignment with respect to said barrel, front and rear spaced yokes on said telescope, a base member on said yokes having at its rear end a spring-pressed plunger, cooperating flat faces on said front saddle and the front of said base, a V-shaped angular base on said rear saddle and a cooperating arcuate angular face on said plunger, said four cooperating faces being so oriented that when the telescope is mounted on the firearm with the base located between the saddles the pressure of the spring-pressed plunger tends to urge the tube into contact with the spaced shoulders of the saddles.

RALPH H. PIKE.

REFERENCES CITED

The following references are of record in the file of this patent:

UNITED STATES PATENTS

| Number | Name | Date |
| --- | --- | --- |
| 2,119,925 | Peterson | June 7, 1938 |
| 2,125,828 | Turner | Aug. 2, 1938 |
| 2,401,825 | Gruner | June 11, 1946 |
| 2,407,977 | English | Sept. 24, 1946 |